United States Patent [19]

Wakabayashi et al.

[11] Patent Number: 5,425,969
[45] Date of Patent: Jun. 20, 1995

[54] METHOD OF COATING ARTICLES MADE OF POLYPROPYLENE WITH AN ELECTRICALLY CONDUCTIVE PRIMER AND ELECTROSTATICALLY APPLIED OVERCOAT

[75] Inventors: Jun Wakabayashi, Nagoya; Shizuo Miyazaki, Okazaki; Toru Tanaka, Nagoya; Junichi Yamashita, Kitakyushu; Akihiro Tsuge, Aichi, all of Japan

[73] Assignees: Toyota Jidosha Kabushiki Kaisha, Toyota; Kansai Paint Company, Limited, Amagasaki, both of Japan

[21] Appl. No.: 80,256

[22] Filed: Jun. 23, 1993

[30] Foreign Application Priority Data

Jun. 26, 1992 [JP] Japan .................. 4-168817

[51] Int. Cl.$^6$ .................. B05D 1/04; B05D 1/38; H01H 1/22; H01H 1/24
[52] U.S. Cl. .................. 427/470; 427/412.3; 427/485; 252/511; 252/512; 524/439; 524/507
[58] Field of Search .................. 427/393.5, 412.3, 470, 427/485; 252/511, 512, 513, 514; 524/439, 440, 507; 525/127, 130

[56] References Cited

U.S. PATENT DOCUMENTS

| | | | |
|---|---|---|---|
| 3,868,338 | 2/1975 | Parsons, III et al. | 524/39 |
| 4,740,426 | 4/1988 | Tremper, III | 428/423.7 |
| 4,954,573 | 9/1990 | Fry et al. | 525/327.6 |
| 5,030,681 | 7/1991 | Asato et al. | 524/504 |
| 5,206,073 | 4/1993 | Suzuki | 428/195 |

FOREIGN PATENT DOCUMENTS

| | | | |
|---|---|---|---|
| 0061165 | 9/1982 | European Pat. Off. | 427/470 |
| 0309286 | 3/1989 | European Pat. Off. | 427/485 |
| 1913890 | 10/1970 | Germany . | |
| 58-53935 | 3/1983 | Japan | 252/511 |
| 2-78470 | 3/1990 | Japan . | |
| 3-162408 | 7/1991 | Japan . | |
| 4-77511 | 3/1992 | Japan . | |
| WO92/22912 | 12/1992 | WIPO . | |

*Primary Examiner*—Terry J. Owens
*Attorney, Agent, or Firm*—Armstrong, Westerman, Hattori, McLeland & Naughton

[57] ABSTRACT

A method for coating an article made of polypropylene with an electrically conductive primer and thereafter electrostatically applying an organic solvent-type overcoat composition to the primer. The electrically conductive primer contains (A) a urethane-modified chlorinated polypropylene which is a mixture or addition reaction product of a chlorinated polypropylene and a polyurethane resin, the chlorinated polypropylene being prepared by chlorinating a homopolymer of propylene or a copolymer of propylene and another olefin monomer, (B) a melamine resin, (C) a polyester resin and (D) an electrically conductive substance such as carbon black, graphite, silver, nickel or copper. The electrically conductive primer has a surface resistivity of up to $1 \times 10^8$ ohms after the application of the overcoat composition.

3 Claims, No Drawings

METHOD OF COATING ARTICLES MADE OF POLYPROPYLENE WITH AN ELECTRICALLY CONDUCTIVE PRIMER AND ELECTROSTATICALLY APPLIED OVERCOAT

The present invention relates to a novel method of coating articles made of polypropylene.

Polypropylene is used for motor vehicle bumpers, side door panels and the like. Coating compositions are applied to these polypropylene parts to give an improved aesthetic appearance and higher durability. The electrostatic coating method is also used for the application of the composition.

Since polypropylene is low in amenability to electrostatic coating, it is usual practice to apply an electrically conductive primer to polypropylene articles before overcoating. The conductive primer heretofore used consists substantially of a urethane-modified chlorinated polypropylene and an electrically conductive substance. However, when an overcoat composition of the organic solvent type is electrostatically applied to the conductive primer coating, the primer coating is rapidly eroded with the organic solvent in the initial stage of the application and given a markedly increased surface resistivity, hence the drawback that the overcoat composition subsequently applied becomes less amenable to the electrostatic coating operation. The coating method has another drawback that the primer coating is not fully satisfactory in adhesion to the overcoat. Accordingly, it is strongly desired to overcome these drawbacks.

An object of the present invention is to provide a novel method of coating polypropylene articles by forming over the article an electrically conductive primer coating which is improved in resistance to organic solvents and in adhesion to an overcoat, and electrostatically coating the primer coating with an overcoat composition having improved amenability to the electrostatic coating operation.

Other objects and features of the present invention will become apparent from the following description.

The present invention provides a coating method characterized by coating an article made of polypropylene with an electrically conductive primer (I), and thereafter electrostatically applying an organic solvent-type overcoat composition (II) to the resulting coating, the conductive primer coating having a surface resistivity of up to $1 \times 10^8$ ohms after the application of the overcoat composition.

We have conducted intensive research to overcome the foregoing drawbacks of the prior art and consequently found that when articles of polypropylene are coated with the above-specified electrically conductive primer and thereafter electrostatically coated with an organic solvent-type overcoat composition, the primer coating is given remarkably improved resistance to organic solvents, so that the increase in the surface resistivity of the primer coating can be suppressed during the application of the overcoat composition, consequently giving the overcoat composition improved amenability to the electrostatic coating operation. We have also found that the above method affords improved adhesion between the primer coating and the overcoat.

The present invention has been accomplished based on these novel findings.

The coating method of the present invention will be described in greater detail.

(1) Polypropylene Articles to be Coated

The articles to be coated by the method of the invention are made of a homopolymer of propylene or a copolymer thereof with other monomer. These polymers are generally used for motor vehicle bumpers, side door panels, etc. These polypropylenes are molded into a desired shape. Preferably, the moldings are surface-treated by a known chemical pretreatment process before coating.

(2) Electrically Conductive Primer (I)

The conductive primer (I) consists primarily of (A) a urethane-modified chlorinated polypropylene, (B) a melamine resin, (C) a polyester resin and (D) an electrically conductive substance. The polypropylene article is directly coated with the primer and thereby given conductivity so that the organic solvent-type overcoat composition (II) can be electrostatically applied to the article.

The urethane-modified chlorinated polypropylene (A) is a mixture or addition reaction product of a chlorinated polypropylene and a polyurethane resin. The chlorinated polypropylene is prepared by chlorinating, for example, a homopolymer of propylene or a copolymer thereof with other olefin monomer, and is preferably 1 to 60 wt. %, more preferably 10 to 40 wt. %, in chlorine content. It is suitable that the chlorinated polypropylene have a number average molecular weight of 5000 to 200000, especially 10000 to 100000. With respect to stereospecificity, the polymer may be isotactic or atactic.

The polyurethane resin for use in preparing the urethane-modified chlorinated polypropylene (A) is the urethanation reaction product of a polyisocyanate compound and a polyol, and preferably has a free hydroxyl group and/or isocyanate group in the molecule. The polyisocyanate compound is a compound having at least two isocyanate groups in the molecule. Usable as such compounds are known aliphatic, aromatic and alicyclic polyisocyanates. The polyol has at least two hydroxyl groups in the molecule. Examples of such polyols are polyester polyols, polyether polyols, low-molecular-weight polyhydric alcohols, etc.

The urethane-modified chlorinated polypropylene (A) for use in the present invention is obtained, for example, by merely mixing together the above-mentioned chlorinated polypropylene and polyurethane resin at room temperature, or blending these polymers together hot with heating at a temperature of at least about 50° C. It is likely that the two components will be chemically combined together by a reaction when blended hot. Although the proportions of the two components can be determined as desired according to the contemplated purpose, it is suitable to use 5 to 95 wt. % of chlorinated polypropylene and 95 to 5 wt. % of polyurethane resin based on the combined weight of solids of the two components.

The melamine resin (B) to be used is a resin already known as a crosslinking agent for resins for coating compositions. Examples of suitable melamine resins are a methylolated product of melamine, etherified melamine resin obtained by etherifying some or all of the methylol groups of the product with at least one alcohol selected from among monovalent alcohols having 1 to 6 carbon atoms, etc. The melamine resin (B) may be merely mixed with the urethane-modified chlorinated polypropylene, or the two components may be blended hot in the same manner as above.

The polyester resin (C) is the ester of a polybasic acid and a polyhydric alcohol. The polybasic acid is a compound having at least two carboxyl groups in the molecule. One or at least two polybasic acids are usable which are selected from among aliphatic, alicyclic and aromatic polybasic acids and which preferably include an alicyclic polybasic acid. While such polybasic acids usable are those already known, preferred are alicyclic polybasic acids having the structure of 1,4-cyclohexylene, such as hexahydroterephthalic acid having such structure, lower ($C_{1-5}$) alkyl esters of said acids, e.g., methyl ester thereof. Use of such alicyclic polybasic acids readily gives coatings which are excellent in appearance on finishing, solvent resistance and flexibility. Anhydrides of these compounds are also usable.

The polyhydric alcohol for preparing the polyester resin (C) is a compound having at least two hydroxyl groups in the molecule. One or at least two alcohols are usable which are selected from among aliphatic, alicyclic and aromatic polyhydric alcohols. It is especially desirable to use an alicyclic polyhydric alcohol among other alcohols. Preferred alicyclic polyhydric alcohols are those having the structure of 1,4-cyclohexylene, such as 1,4-cyclohexanedimethanol, hydrogenated bisphenol A and hydrogenated bisphenol F. Use of such alcohols readily affords coatings which are excellent in appearance on finishing, solvent resistance and flexibility.

The content of aliphatic polybasic acid and/or polyhydric alcohol in the polyester resin (C) is determined as desired according to the contemplated purpose, and is preferably 10 to 65 wt. %, more preferably 20 to 55 wt. %, based on the solids of the polyester resin. The polyester resin (C) is prepared by subjecting the above polybasic acid and polyhydric alcohol to a known esterification reaction, along with a monobasic acid, hydroxycarboxylic acid or the like when so desired.

Useful polyester resins (C) include a urethane-modified polyester resin obtained by reacting a polyisocyanate compound with the esterification reaction product of polybasic acid and polyhydric alcohol. Examples of useful polyisocyanate compounds are aliphatic, alicyclic and aromatic polyisocyanate compounds having at least two isocyanate groups in the molecule. Also usable as polyisocyanate compounds are addition reaction products of these polyisocyanate compounds and polyhydric alcohols, biuret-type addition reaction products thereof, isocyanuric ring-type addition reaction products thereof, etc. Especially preferred polyisocyanate compounds are hexamethylene diisocyanate, trimethylhexamethylene diisocyanate, isophorone diisocyanate, 1,3- (or 1,4-) (isocyanatemethyl)cyclohexane and addition reaction products containing such a compound. For preparing the urethane-modified polyester resin, it is suitable to use 0.5 to 20 parts by weight of polyisocyanate compound per 100 parts by weight of polyester resin. Preferably, the polyester resin contains hydroxyl groups in an excessive amount relative to the amount of isocyanate groups present in the polyisocyanate compound.

Preferably, the polyester resin (C) is 50 to 150 mg KOH/g resin, more preferably 80 to 120 mg KOH/g resin, in hydroxyl value, 1 to 40 mg KOH/g resin, more preferably 3 to 20 mg KOH/g resin, in acid value, and 1300 to 8000, more preferably 1500 to 5000, in number average molecular weight as determined by GPC.

The electrically conductive substance (D) is a substance for imparting electrical conductivity to the conductive primer coating. More specifically, one or at least two substances are used which are selected from among conductive carbon black, silver, nickel, copper, graphite, etc. Preferably, these substances are in the form of a powder or particles, and are suitably 0.1 to 500 μm in particle size.

The conductive primer (I) of the present invention consists essentially of the foregoing components (A), (B), (C) and (D) in proportions which are determined as desired in accordance with the purpose. For example, it is desirable to use 5 to 30, more preferably 10 to 20, parts by weight of component (B), and 5 to 30, more preferably 10 to 20, parts by weight of component (C) per 100 parts by weight of component (A), and 1 to 100, more preferably 10 to 50, parts by weight of component (D) per 100 parts by weight of the total amount of components (A), (B) and (C).

In addition to the foregoing components (A), (B), (C) and (D), (E) an epoxy resin, (F) a cellulose acetate butyrate, (G) a polyether resin, etc. can be suitably incorporated into the conductive primer (I) of the invention when so required.

Preferable as the epoxy resin (E) is glycidyl ether of the bisphenol type, whereas other resins are also usable insofar as they do not result in impaired properties. It is suitable that the epoxy resin (E) have a number average molecular weight of 500 to 8000 and an epoxy equivalent of 100 to 3000.

The cellulose acetate butyrate (hereinafter referred to as "CAB") (F) is an ester of cellulose formed by the action of a mixture of acetic acid and butyric acid on cellulose. Preferably, the CAB is generally 1 to 34 wt. %, more preferably 1 to 7 wt. %, in acetyl group content, generally 16 to 60 wt. %, more preferably 40 to 60 wt. %, in butyryl group content, and in the range of 0.005 to 5 sec., more preferably 0.005 to 1 sec., in viscosity as measured by the method of ASTM-D-1343154. Examples of such CABs are available under the brand names of CAB-171-2, CAB-381-0.2, CAB-531-1, CAB-551-0.2 and CAB-551-0.01, i.e., products of Eastman Chemical Products, Inc., U.S.A. Among these, CAB-381-0.2, CAB-551-0.2 and CAB-551-0.01, which have a high butyryl group content and low viscosity, are desirable from the viewpoint of solubility, compatibility, viscosity, etc.

Suitable as the polyether resin (G) is a polyether polyol which is obtained using at least one alkylene oxide selected, for example, from among ethylene oxide, propylene oxide, butylene oxide and tetramethylene oxide. Preferably, the polyether polyol is about 1000 to 200000 in number average molecular weight and 20 to 200 in hydroxyl value.

Although the amounts of components (E), (F) and (G) to be incorporated into the conductive primer (I) of the invention can be determined as desired in accordance with the contemplated purpose, it is desirable to use 0 to 20 parts by weight, more desirably 3 to 10 parts by weight, of component (E), 0 to 20 parts by weight, more desirably 3 to 15 parts by weight, of component (F) and 0 to 20 parts by weight, more desirably 3 to 10 parts by weight, of component (G) per 100 parts by weight of the total amount of components (A), (B), (C) and (D).

The components (A) to (G) are mixed with or dispersed in a usual organic solvent for coating compositions, and the mixture or dispersion is adjusted to a solids content of 10 to 60 wt. %, whereby a conductive primer (I) of the invention is obtained.

(3) Organic Solvent-Type Overcoat Composition (II)

The composition (II) is applied to the coating of the conductive primer (I). It is a coating composition for forming a coating which is excellent in weather resistance, smoothness and resistance to chemicals. Examples of useful coating compositions are known overcoat compositions such as acrylic resin/amino resin or polyisocyanate compositions, alkyd resin or polyester resin-/amino resin or polyisocyanate compositions, etc. These overcoat compositions (II) are usable as clear coating compositions completely or almost free from coloring agents such as coloring pigments and metallic pigments, solid color coating compositions containing coloring pigments and metallic coating compositions containing metallic pigments. These overcoat compositions (II) are of the organic solvent type which contains an organic solvent as a dissolving or dispersing medium, and are preferably 10 to 60 wt. % in solids content.

The coating method of the present invention is characterized by coating a polypropylene article with the conductive primer (I), and thereafter applying the organic solvent-type overcoat composition (II) to the resulting primer coating.

The conductive primer (I) is applied preferably by an air spray or airless spray. The thickness of the coating is preferably in the range of 5 to 30 μm when the coating is cured. The coating can be cured by being heated at 80° to 150° C.

Subsequently, the organic solvent-type overcoat composition (II) is electrostatically applied to the coating of conductive primer (I) as cured by heating, and then heated at 110° to 150° C. to form a cured overcoat. When cured, the overcoat is preferably in the range of 10 to 60 μm in thickness. In this case, the overcoat composition (II) may be applied to the coating of conductive primer (I) in an uncured state, followed by heating as above to cure the primer coating and the overcoat at the same time. Methods of applying the overcoat composition (II) include, for example, a one-coat method using a solid color coating composition and a two-coat method using a solid color coating composition or metallic coating composition and a clear coating composition.

The coating method of the present invention has the following advantages.

(1) The coating of conductive primer (I) formed by the coating method of the invention exhibits excellent adhesion to polypropylene articles and the overcoat and retains the adhesion without deterioration, blistering or other faults even when immersed in hot water for a long period of time.

(2) The coating of conductive primer (I) has high solvent resistance, so that when the coating is further coated with the organic solvent-type overcoat composition (II), the organic solvent contained in the composition (II) is less likely to dissolve or swell the primer coating. The conductive primer (I) therefore retains a surface resistivity of up to $1 \times 10^8$ ohms during and after the application of the solvent-type overcoat composition (II). This readily permits electrostatic coating at a high voltage (e.g., at least $-90$ kV) to deposit the overcoat composition on the article to be coated with a remarkably improved efficiency.

The surface resistivity of the coating of conductive primer (I) of the present invention was measured by the following method after the application of the overcoat composition. First, the organic solvent-type overcoat composition (II) was applied to the coating of conductive primer (I) as cured, with a release tape affixed to two portions (35 mm away from each other) of the primer coating before the application to leave the coating locally uncoated with the overcoat composition (II). The release tape was peeled off after the application of the overcoat composition (II) to remove the composition (II) and expose the two portions of the primer coating. Upon lapse of 1 minute at room temperature after the application of the overcoat composition (II), the surface resistivity between the exposed portions of the coating of primer (I) was measured as the surface resistivity of the primer coating. According to the present invention, the resistivity is maintained at a value not higher than $1 \times 10^8$ ohms after the start of application of the overcoat composition until the completion of application, hence the above technical advantages.

The present invention will be described with reference to the following preparation example, examples and comparative example, in which the parts and percentages are by weight as a rule.

Preparation Example 1 Preparation of Samples

1) Urethane-modified chlorinated polypropylene

The chlorinated polypropylenes listed in Table 1 were used for preparing urethane-modified chlorinated polypropylenes A-1 to A-3, the proportions of components of which are shown in Table 1.

TABLE 1

| Urethane-modified chlorinated polypropylene | A-1 | A-2 | A-3 |
| --- | --- | --- | --- |
| Chlorinated polypropylene | | | |
| Chlorine content (%) | 15 | 25 | 35 |
| Number average molecular weight | 20000 | 40000 | 60000 |
| Component proportion (*1) | | | |
| Chlorinated polypropylene | 40 | 50 | 30 |
| Polyurethane (*2) | 60 | 50 | 70 |

(*1) Component proportion: solids proportion by weight.
(*2) Polyurethane: urethanation reaction product of diisocyanate and glycol, having terminal isocyanate group.

2) Urethane-modified polyester resin

Urethane-modified polyester resins C-1 to C-3 were prepared each by reacting the materials listed in Table 2 in a usual manner to obtain a polyester resin and reacting the resin with the diisocyanate given in the same table for urethanation. The amounts of polyester resin materials and diisocyanates listed in Table 2 are in parts.

TABLE 2

| Urethane-modified polyester resin | C-1 | C-2 | C-3 |
| --- | --- | --- | --- |
| Polyester resin materials | | | |
| Isophthalic acid | 32.70 | 32.70 | 41.83 |
| Hexahydroterephthalic acid | 52.05 | 52.05 | |
| Adipic acid | 53.29 | 53.29 | 85.85 |
| Trimethylolpropane | 27.30 | 27.30 | 27.30 |
| Neopentyl glycol | | | 15.75 |
| 1,4-Cyclohexanedimethanol | 43.20 | 93.60 | |
| 1,5-Pentanediol | 83.20 | 52.00 | |
| Diisocyanates | | | |
| Hexamethylene diisocyanate | 4.44 | 4.68 | |
| Isophorone diisocyanate | | | 7.02 |

TABLE 2-continued

| Urethane-modified polyester resin | C-1 | C-2 | C-3 |
|---|---|---|---|
| Characteristics value | | | |
| Acid value (mg KOH/g resin) | 6.7 | 5.5 | 8.1 |
| Hydroxyl value (mg KOH/g resin) | 93 | 86 | 114 |
| Number average molecular weight (GPC) | 2300 | 2400 | 2800 |

3) Preparation of electrically conductive primer

The components listed in Table 3 were mixed with or dispersed in an organic solvent (mixture of toluene and xylene in equal amounts by weight) to prepare each of electrically conductive primers i to iii. The amounts of components listed are in parts.

TABLE 3

| Electrically conductive primer | | i | ii | iii |
|---|---|---|---|---|
| Urethane-modified chlorinated polypropylene | Name | A-1 | A-2 | A-3 |
| | Amount | 100 | 100 | 100 |
| Melamine resin (*1) | Amount | 10 | 15 | 20 |
| Urethane-modified polyester resin | Name | C-1 | C-2 | C-3 |
| | Amount | 10 | 15 | 15 |
| Electrically conductive substance (*2) | Name | KETJENBLACK EC | | |
| | Amount | 30 | 30 | 30 |
| Epoxy resin (*3) | Name | EPON 1001 | | |
| | Amount | — | 7 | 6 |
| CAB (*4) | Name | CAB-381-0.2 | | |
| | Amount | — | 10 | 7 |
| Polyether resin (*5) | Amount | — | 8 | 7 |
| Clay | Amount | 30 | 30 | 30 |

(*1) Melamine resin: butyletherified melamine resin.
(*2) KETJENBLACK EC: brand name of conductive carbon black manufactured by Lion Company Ltd.
(*3) EPON 1001: brand name of bisphenol-type glycidyl ether (about 950 in molecular weight, 450-500 in epoxy equivalent) manufactured by Shell Chemical Co., Ltd.
(*4) CAB-381-0.2: brand name of product of Eastman Chemical Products, Inc., 5% in acetyl group content, 38% in butyryl group content, 0.2 sec. in viscosity (ASTM-D-1343154).
(*5) Polypropylene glycol: about 20000 in number average molecular weight.

Examples 1-3 and Comparative Example 1

To the surface of polypropylene panels for motor vehicle bumpers treated with trichloroethane was applied the conductive primer (adjusted to a solids content of 10%) obtained in Preparation Example 1 by an air spray to a thickness of 10 to 20 μm when cured. The coating was heated at 120° C. for 10 minutes for curing, thereafter electrostatically coated with a solid color overcoat composition of the organic solvent type (polyester resin/melamine resin coating composition, brand name "SOFLEX #1211 Black", 20% in solids content, product of Kansai Paint Company, Limited) by a bell-type electrostatic coater (voltage: −90 kV) to a thickness of 25 to 35 μm (when cured), and heated at 120° C. for 20 minutes for curing. The double-layer coating thus formed was tested for properties with the results given in Table 4.

TABLE 4

| | Example | | | Comp. Ex. |
|---|---|---|---|---|
| | 1 | 2 | 3 | 1 |
| Conductive primer | i | ii | iii | iv |
| Overcoat composition | Organic solvent-type solid color composition | | | |
| Properties | | | | |
| Resistivity (1 x) | $10^7$ | $10^7$ | $10^8$ | $10^{10}$ |
| Water resistance | A | A | A | B |
| Water-resistant adhesion | A | A | A | B |
| Deposition efficiency (%) | 85 | 85 | 85 | 45 |

The conductive primer (iv) has the composition of the primer (i) from which the melamine resin and urethane-modified polyester resin were omitted.

Test methods

Resistivity: The surface resistivity (ohms) measured between two points (35 mm away from each other) of the conductive primer coating, prepared by the method already described, using TREK MODEL 150 (brand name, product of TREK INC.).

Water resistance: The coated panel was immersed in hot water at 40° C. for 10 days and thereafter checked for appearance. A stands for "no change", and B for occurrence of blisters.

Water-resistant adhesion: The coated panel was immersed in hot water at 40° C. for 10 days and then dried at room temperature. The coating was thereafter cut with a knife through its thickness to the substrate to form one hundred 2×2 mm squares. An adhesive cellophase tape was affixed to the cut coating and subsequently quickly peeled off. The number of squares remaining on the substrate was counted. A stands for "no change", and B for separation of many squares.

Deposition efficiency: The ratio (%) of the amount overcoat composition deposited on the panel to the amount of overcoat composition sprayed.

We claim:

1. A coating method comprising coating an article made of polypropylene with an electrically conductive primer (I), and thereafter electrostatically applying an organic solvent overcoat composition (II) to the resulting coating, the conductive primer (I) comprising (A) a urethane-modified chlorinated polypropylene which is a mixture or addition reaction product of a chlorinated polypropylene and a polyurethane resin, the chlorinated polypropylene being prepared by chlorinating a homopolymer of propylene or a copolymer thereof with an olefin monomer, (B) a melamine resin, (C) a polyester resin and (D) an electrically conductive substance, and the conductive primer coating having a surface resistivity of up to $1 \times 10^8$ ohms after the application of the overcoat composition.

2. A coating method as defined in claim 1 wherein the conductive primer (I) comprises 5 to 30 parts by weight of component (B) and 5 to 30 parts by weight of component (C) per 100 parts by weight of component (A), and 1 to 100 parts by weight of component (D) per 100 parts by weight of components (A), (B) and (C) combined.

3. A coating method as defined in claim 1 wherein the conductive primer (I) further comprises at least one of (E) an epoxy resin, (F) a cellulose acetate butyrate and (G) a polyether resin.

* * * * *